July 13, 1926.
J. LEDWINKA
1,592,605
ELECTRIC WELDING
Filed Nov. 10, 1921
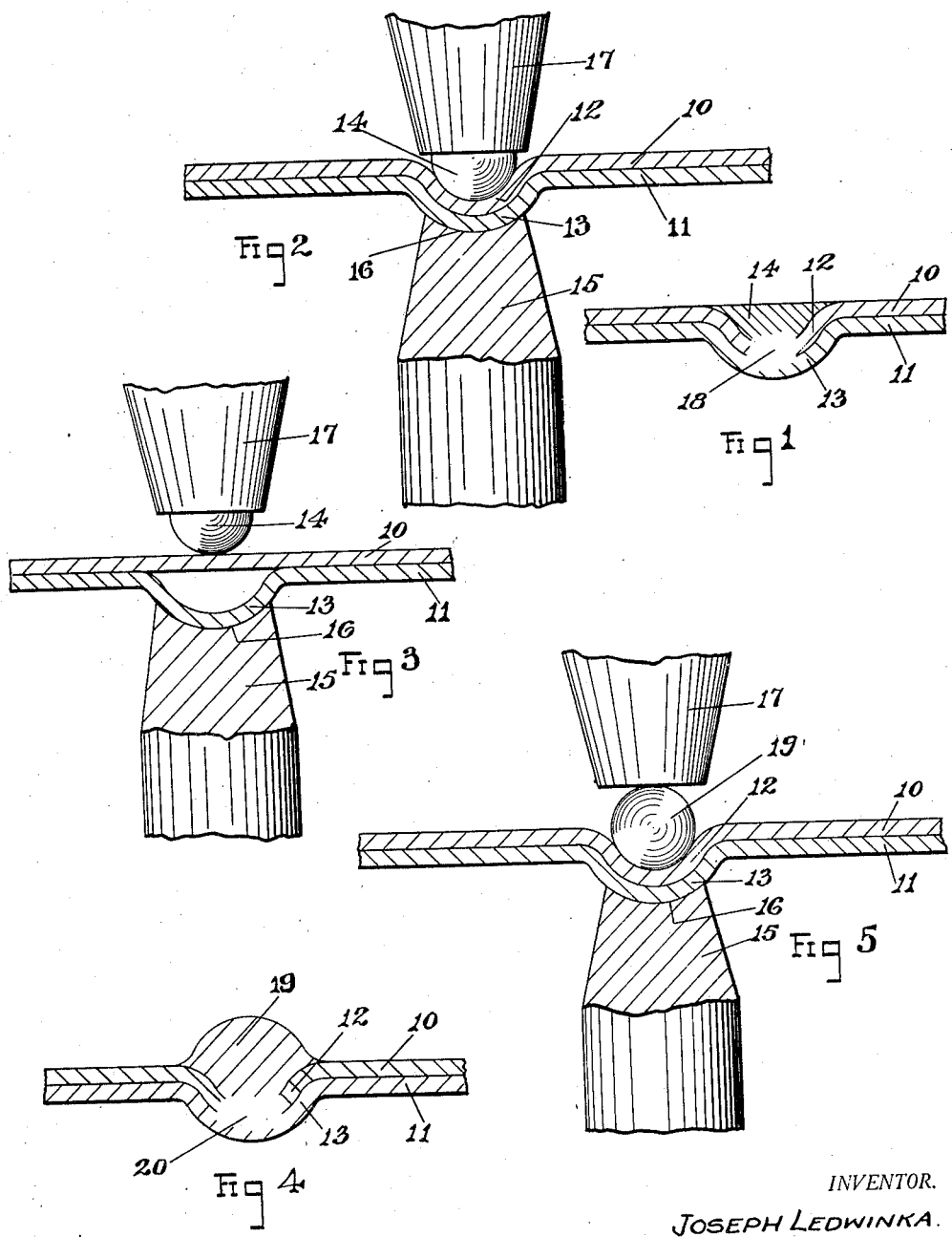
INVENTOR.
JOSEPH LEDWINKA.
BY
ATTORNEY.
Witness Patented July 13, 1926.

1,592,605

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING.

Application filed November 10, 1921. Serial No. 514,153.

This invention relates to improvements in electric welding and, more particularly, that sort of electric welding known as spot-welding.

One of the objects of my invention is to provide a particularly strong and lasting welded joint between two metal members, which will simulate the appearance of a riveted joint.

Another object of my invention is to provide a method of electrically welding metal members together which will produce a strong welded joint resembling in appearance a riveted joint.

A further object of my invention is to provide a method of spot-welding metal sheets together which eliminates the buckling or wrinkling of the sheets, even when one of them is thinner than the other.

Further objects, and objects relating to economies and details of operation, will definitely appear from the detailed description to follow. My invention is clearly defined and pointed out in the appended claims. Preferred embodiments of my invention are illustrated in the accompanying drawing, forming a part of this specification, in which:

Fig. 1 is a sectional view through a welded joint in accordance with my invention.

Fig. 2 is a view, partly in section and partly in elevation, showing one method of making the welded joint shown in Fig. 1.

Fig. 3 is a similar view showing another method of forming the welded joint shown in Fig. 1.

Fig. 4 is a sectional view through another form of welded joint in accordance with my invention, and Fig. 5 is a view, partly in section and partly in elevation, showing one method of forming the welded joint shown in Fig. 4.

In the drawing, similar reference numerals refer to similar parts throughout the several views.

In general, I carry out my invention by providing permanent depressions in the pieces of metal to be united, which depressions are nested one within the other, connecting the pieces of metal by spot welds located in said depressions, and, in addition to this, providing filling pieces which are positioned in and welded in place in the nested depressions. I prefer to use spherically-shaped members as these filling pieces, either hemispherical pieces or completely spherical, depending upon the appearance which one wishes to give the finished product. In making this welded joint, I find it very convenient to use an electrode having a cup-shaped or hemispherical socket in its end to receive the nested depressions. The depressions in the pieces of metal to be united may be formed prior to the welding operation, in which case the nested depressions and the spherically-shaped filling piece are placed between the electrodes and pressure and welding current applied, with the result that the filling piece and pieces of metal are welded together by a weld located in the nested depressions. In some cases, I prefer to form one of the depressions prior to the welding operation in which case the metal of the member to be united to it is pressed down into the previously formed depression by the spherically-shaped filling piece, when the pressure is applied by the welding electrodes and the weld formed. In neither case are the permanent depressions reduced by the welding operation, and with the result that the exterior surface of the outermost one after the weld is completed resembles the head of a rivet.

In Fig. 1, I have shown a welded joint embodying my invention, utilized for uniting together the pieces of metal, 10 and 11. The piece, 10, has a hemispherical depression, 12, and the piece, 11, a hemispherical depression, 13, the depression, 12, being nested within the depression, 13, when the pieces of metal are assembled in position to be welded together. A spherically-shaped filling piece, 14, is seated within the depression, 12, and the filling piece, 14, and pieces of metal, 10 and 11, are all integrally united by the spot-weld, 18, located in the nested depressions.

In Fig. 2, I have illustrated one method of forming the welded joint shown in Fig. 1. According to this method, the depressions, 12 and 13, are first formed in the members, 10 and 11, and the members, 10 and 11, are brought into overlapping contact with each other, with the depression, 12, nested in the depression, 13. The nested depressions are seated in the cup-shaped socket, 16, formed in the end of the lower electrode, 15. A hemispherical filling piece, 14, is seated in the depression, 12, and engaged by the upper electrode, 17. When pressure is applied and the welding circuit closed, the welding current flows between the electrodes, 15 and 17, through the filling piece, 14, and the pieces of metal, 10 and 11, and the filling piece, 14, and members, 10 and 11, are heated and fused together, forming the spot-weld, 18, within the nested depressions. Due combinedly to the proper control of pressure and current and the use of the cup-shaped socket, 16, the depressions are not reduced in the welding operation, but remain to simulate the heads of rivets.

In Fig. 3, I have shown another method of forming the welded joint shown in Fig. 1. According to this method, no depression is formed previously in the piece of metal, 10. The depression, 13, of the piece, 11, is seated in the cup-like socket, 16, of the electrode, 15, and the member, 10, is laid above the member, 11, bridging across the depression, 13. The hemispherical filling piece, 14, is applied to the upper surface of the member, 10, in line with the depression, 13, and engaged by the upper electrode, 17. When pressure is applied and the welding circuit closed, the passage of the electric current heats the parts between the electrodes, the metal of the piece, 10, is forced down into the depression, 13, and the members, 10 and 11, and the filling piece, 14, are welded together, forming the joint shown in Fig. 1. In some cases, it is not necessary to form the depression previously in either of the members, 10 or 11, both of them being forced down into the socket, 16, of the lower electrode by the spherically-shaped filling piece, 14, when pressure is applied by the upper electrode, 17.

In Fig. 4, I have shown a slightly different form of welded joint which differs from that shown in Fig. 1, merely in the fact that a completely spherical filling piece, 19, is used instead of the hemisphere, 14. This gives a joint which has the appearance of a riveted joint on both sides. Fig. 5 illustrates one method of making the welded joint shown in Fig. 4 and this view is identical with Fig. 2, with the exception that the ball, 19, is substituted for the hemisphere, 14.

This method of electrically welding together pieces of metal gives a very strong and lasting joint or connection between the members and, furthermore, it is a joint which resembles, in appearance, a riveted joint, either on one or both sides, according as a hemisphere or a sphere is used as the filling piece. This method of electrically welding pieces of metal together prevents any wrinkling or buckling as the excess metal is taken up in the depressions and, by this method, thin sheets may be united to thicker ones without any of the objectionable wrinkling or buckling which takes place when the usual spot-welding methods are employed.

In practice, I have employed this method in joining pieces of steel and have used copper electrodes having a resistivity considerably less than the pieces of steel to be united. I do not wish to be restricted, however, to the uniting of pieces of steel or to the use of copper electrodes as I believe that my invention is applicable to the uniting of parts of other metal and that other materials are available for use as electrodes.

I am aware that this embodiment of my invention may be varied considerably without departing from the spirit thereof and, therefore, I claim my invention broadly, as indicated by the appended claims.

Having thus described my invention, what I claim as new and desire to secure by Letters Patent is:—

1. The process of uniting two pieces of metal consisting in providing depressions in said pieces, nested one within the other, and electrically welding together said pieces and a spherically-shaped filling piece nested with said depressions by a weld located in said depressions.

2. The process of uniting two pieces of metal consisting in providing depressions in said pieces, nested one within the other, positioning a spherically-shaped filling piece in said nested depressions, and electrically welding together said filling piece and pieces of metal by a weld located in said depressions without reducing said depressions.

3. The process of uniting two pieces of metal consisting in preliminarily providing a depression in one only of said pieces, forcing a filling piece and the metal of the other of said pieces into said depression, and electrically welding together said filling piece and pieces of metal by a weld located in said depression.

4. Composite metal work comprising pieces of metal having permanent depressions nested one within the other and depression filling pieces positioned in said nested depressions, said filling pieces and pieces of metal being connected by electric spot-welds located in said depressions.

5. A joint consisting of sheets, plates or other forms of pieces of metal, and a filler, all integrally united together within nested depressions in said sheets, plates or pieces, said nested depressions being of permanent form whereby to simulate a riveted joint between the several sheets or plates of metal.

6. A joint having an enlargement to resemble a rivet consisting of metal sheets, plates or other form of pieces having permanent nesting depressions formed therein and having exterior surfaces simulating rivet heads, an auxiliary metal piece disposed in said depressions, said plates, sheets or pieces and auxiliary metal piece all electrically welded together at a point within said permanent depressions.

In testimony whereof, I affix my signature.

JOSEPH LEDWINKA.